United States Patent
Dalton et al.

(10) Patent No.: US 9,891,387 B2
(45) Date of Patent: *Feb. 13, 2018

(54) FIBER OPTIC ADAPTER WITH ENHANCED ALIGNMENT

(71) Applicant: Panduit Corp., Tinley Park, IL (US)

(72) Inventors: John G. Dalton, New Lenox, IL (US); Jerry A. Wiltjer, Frankfort, IL (US); Calvin H. Derr, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,985

(22) Filed: Jul. 21, 2017

(65) Prior Publication Data

US 2017/0343742 A1 Nov. 30, 2017

Related U.S. Application Data

(63) Continuation of application No. 12/546,311, filed on Aug. 24, 2009, now Pat. No. 9,720,183.

(51) Int. Cl.
*G02B 6/38* (2006.01)

(52) U.S. Cl.
CPC .................. *G02B 6/3825* (2013.01)

(58) Field of Classification Search
CPC .................................................. G02B 6/3825
See application file for complete search history.

(56) References Cited

U.S. PATENT DOCUMENTS

| | | | |
|---|---|---|---|
| 5,073,045 A | 12/1991 | Abendschein | |
| 5,138,679 A | 8/1992 | Edwards et al. | |
| 5,138,680 A | 8/1992 | Briggs et al. | |
| 5,333,222 A | 7/1994 | Belenkiy et al. | |
| 5,418,875 A | 5/1995 | Nakano et al. | |
| 5,909,526 A | 6/1999 | Nakano et al. | |
| 6,076,975 A | 6/2000 | Roth | |
| 6,210,045 B1 | 4/2001 | Dean, Jr. et al. | |
| 6,276,840 B1 | 8/2001 | Weiss et al. | |
| 6,364,536 B1 | 4/2002 | Chen et al. | |
| 6,425,692 B1 | 7/2002 | Fujiwara et al. | |
| 6,793,400 B2 | 9/2004 | Massey et al. | |
| 6,863,446 B2 | 3/2005 | Ngo | |
| 2002/0168135 A1 | 11/2002 | Dautartas et al. | |
| 2003/0169974 A1 | 9/2003 | Ngo | |
| 2004/0105626 A1 | 6/2004 | Gallup et al. | |
| 2004/0228584 A1 | 11/2004 | Dudek et al. | |
| 2005/0111796 A1 | 5/2005 | Matasek et al. | |

FOREIGN PATENT DOCUMENTS

| | | |
|---|---|---|
| CN | 1809773 A | 7/2006 |
| JP | 04253005 A | 9/1992 |
| TW | I255359 | 5/2006 |
| TW | I338823 | 5/2006 |

*Primary Examiner* — John M Bedtelyon
(74) *Attorney, Agent, or Firm* — Christopher S. Clancy; James H. Williams; Christopher K. Marlow

(57) ABSTRACT

A fiber-optic adapter with enhanced alignment is described. The adapter has two opposing housing halves and two opposing floating connector latches. Each housing half has a channel. The channels are configured to align when the two housing halves are secured together. The channels of the housing halves also have pockets which are configured to utilize a clearance fit, allowing the connector latches to float when the housing halves are secured together.

15 Claims, 4 Drawing Sheets

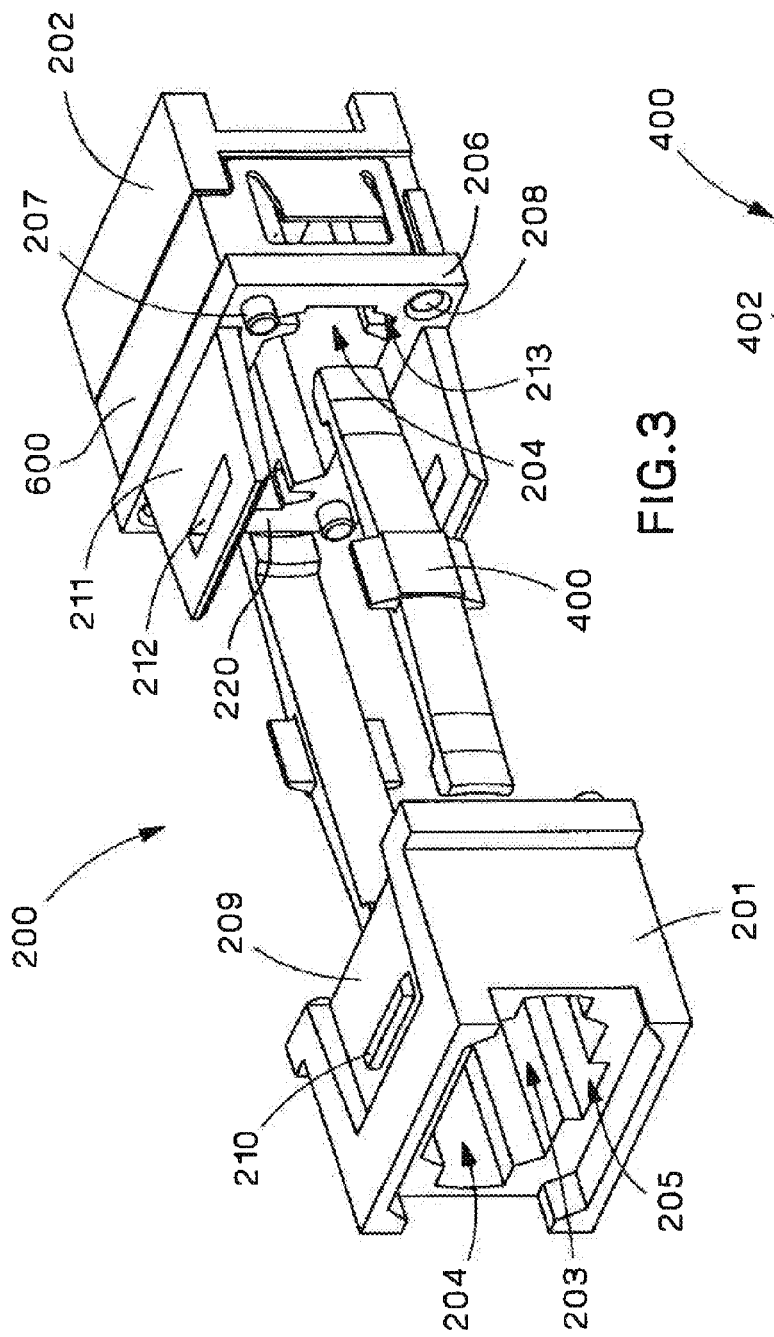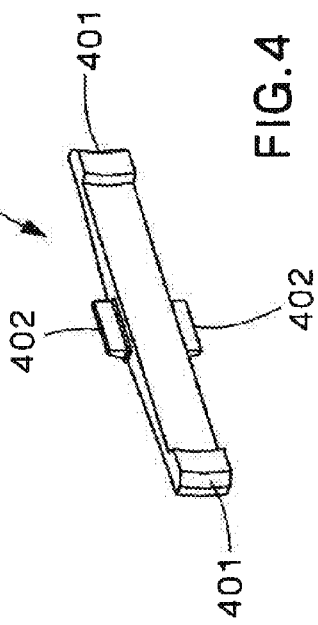

FIBER OPTIC ADAPTER WITH ENHANCED ALIGNMENT

CROSS REFERENCE TO RELATED APPLICATIONS

This application claims priority to U.S. patent application Ser. No. 12/546,311, filed Aug. 24, 2009, which will issue as U.S. Pat. No. 9,720,183 on Aug. 1, 2017, the subject matter of which is hereby incorporated by reference in its entirety.

FIELD OF THE INVENTION

The present invention relates generally to adapters for fiber optic connectors and specifically to adapters with enhanced alignment for multi-fiber push on (MPO) type connectors.

BACKGROUND OF THE INVENTION

FIG. 1 shows an example of the prior art, a typical MPO adapter 100. The construction of the adapter 100 uses latches 102 that are integral to an inner shell 101. The inner shell 101 is typically constrained within an outer shell 103 via ultrasonic welding. The assembly tolerances in such a design become critical in order to maintain proper connector mating alignment. This construction can impart a side load on an MPO connector if the tolerance stack-up is not tightly controlled. A side load can be caused by an out-of-tolerance part geometry, assembly tolerances, or ultrasonic welding variances.

Traditional MPO adapters do not allow mated connectors to adjust relative to the housing. They also utilize latches that are sectioned across the mid-line of the adapter. To create an opposing connector engagement, two such components must be assembled together, increasing the tolerance stack-up even more, and making it more cumbersome to control the alignment of mated connectors.

SUMMARY OF THE INVENTION

This application describes a fiber-optic adapter with enhanced alignment. The adapter has two opposing housing halves and two opposing floating connector latches. Each housing half has a channel for the mating connectors. The channels are configured to align when the two housing halves are secured together. The channels of the housing halves have pockets configured with a clearance fit, allowing the connector latches to float when the housing halves are secured together.

BRIEF DESCRIPTION OF FIGURES

FIGS. 2 and 3 are exploded perspective views of a first embodiment of an MPO adapter with enhanced alignment;

FIG. 4 is a perspective view of a floating connector latch to be used with the MPO adapter of FIGS. 2 and 3;

DETAILED DESCRIPTION OF THE PREFERRED EMBODIMENTS

Figure 1:
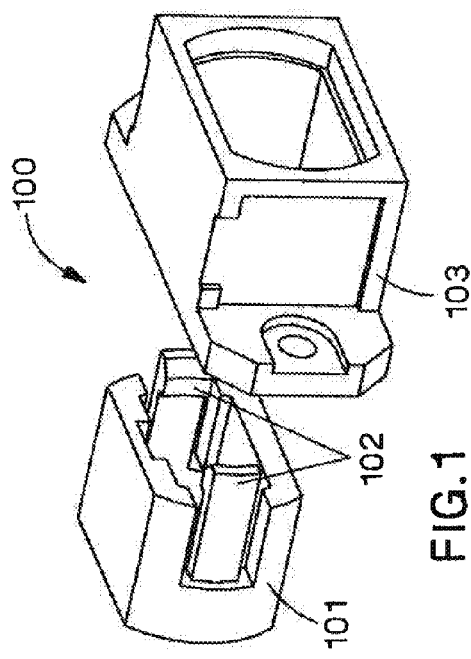
FIG. 1 is a perspective view of a prior art MPO adapter.
Figure 2:
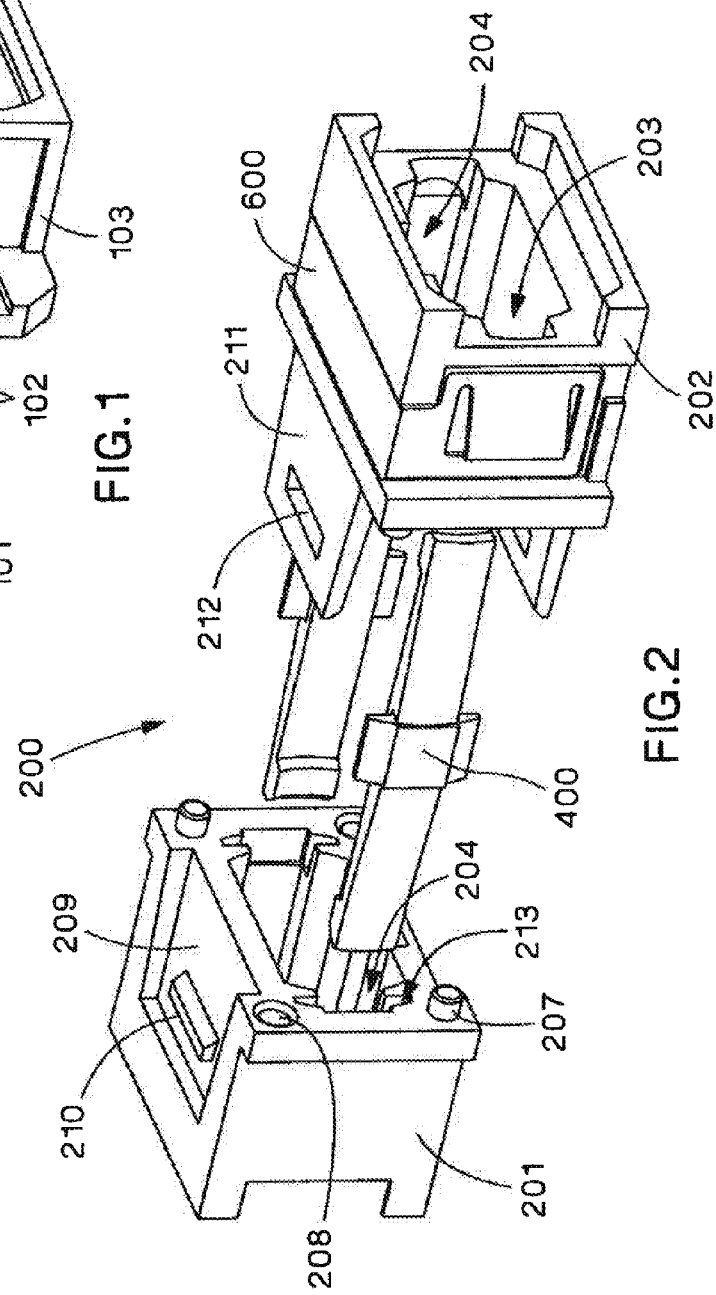

FIGS. 2 and 3 show a first embodiment of an MPO adapter 200 with enhanced alignment. The adapter comprises a pair of opposing housing halves 201, 202 and a pair of opposing floating connector latches 400.

The opposing housing halves 201, 202 contain a channel 203 that is sized to accommodate an MPO connector (in one embodiment, the adapter dimensions can conform to TIA-604-5-B, Fiber Optic Intermateability Standard—Type MPO). The channels 203 are configured to align and form a longer channel when the opposing housing halves 201, 202 are secured together. The housing halves 201, 202 also have latch pockets 204 formed in opposite sides of the channel 203. The latch pockets 204 are configured with a clearance fit, allowing the connector latches 400 to float within the channel 203 when the opposing housing halves 201, 202 are secured together. The channels 203 can also incorporate polarity keyways 205 (best shown in FIG. 3). The opposing housing halves 201, 202 can be configured wherein the mating features have a rotational symmetry of 180 degrees along a longitudinal axis in order to allow the polarity keyways 205 to be aligned for either a straight through or a key up/key down orientation.

The opposing housing halves 201, 202 can have assembly pins 207 and assembly holes 208 to facilitate the mating of the housing halves 201, 202. In the embodiment shown in FIGS. 2 and 3, the assembly holes 208 are located on diagonally opposite corners (on the same face) from each other and the assembly pins 207 are also located on diagonally opposite corners from each other.

The housing halves 201, 202 can also utilize flanges 206 to aid in seating an adapter into a panel or cassette opening and to also facilitate mating the housing halves 201, 202 together.

In the embodiment shown in FIGS. 2 and 3, the opposing housing halves 201, 202 can constitute a male housing half 202 and a female housing half 201. The female housing half 201 has a pair of snap receiving areas 209 located on a top and bottom face of the housing half 201. Each receiving area 209 can contain a lever-arm catch 210. The lever-arm catch 210 can have a back-rake angle in order to allow an interference snap-fit to create a positive loading between the two housing halves 201, 202.

The male housing half 202 has a pair of lever-arms 211 projecting from and perpendicular to a mating face 220 of the male housing half 202 along a top and bottom edge. The lever-arms have catch-slots 212 formed in them in order to engage the lever-arm catches 210 located in the receiving areas 209 of the female housing half 201. This embodiment can also incorporate mating features on the flanges 206 such as interlocking fingers or dovetail joints in order to distribute the assembly load and decrease mating stresses on the lever-arm catch 210. Locating the receiving areas 209 on opposite faces such as the top and bottom face as well as having the lever-arms 211 extend from opposite edges of the mating face gives the housing halves 201, 202 a rotational symmetry of 180 degrees, which allows for either a straight-through orientation or a key up/key down orientation.

FIG. 4 shows a floating connector latch 400. The floating connector latch 400 has engagement features 401 formed at both ends. The engagement features 401 on the floating connector latch 400 span the distance between the corresponding retention notches 601 on the connector (see FIG. 6A for the connector retention notches 601). Incorporating the two opposing connector engagement features 401 into a single component (the floating connector latch 400) allows for tighter tolerances and control over the distance between the mated connectors' mechanical reference planes, which results in more consistent contact mating pressure and performance.

The floating connector latch 400 also allows for the part material to be tailored to the mechanical strength required for optimum operation of the connector assembly. The floating connector latch 400 can be manufactured of a different material, polymeric or metallic, without impacting the assembly tolerances. The floating connector latch 400 design facilitates control of the material flow while molding to ensure mechanical strength and durability. The floating connector latch 400 can also have a long beam length to minimize strain on the latch during insertion and retraction of the connector which increases the adapter's overall strength and durability.

The floating connector latch 400 can also have a pair of stabilizing tabs 402 extending from a top and bottom edge of the latch 400 proximate to the center of the floating connector latch 400. The tabs 402 engage pocket slots 213 (see FIGS. 2 and 3 for the pocket slots 213) incorporated in the latch pockets 204 utilizing a clearance fit. This arrangement prevents the connector latches 400 from being rigidly attached to the housing halves 201, 202 and helps to control the mating distance of the connectors by allowing the connectors to move and adjust, in unison, relative to the housing due to strain (such as cable loading) without adversely affecting the optical alignment of the connectors. This arrangement also minimizes insertion loss by allowing some freedom in the movement of the connectors and reduces ferrule pin-to-pocket binding for better overall ferrule mating and improved side loading performance.

Figure 5:
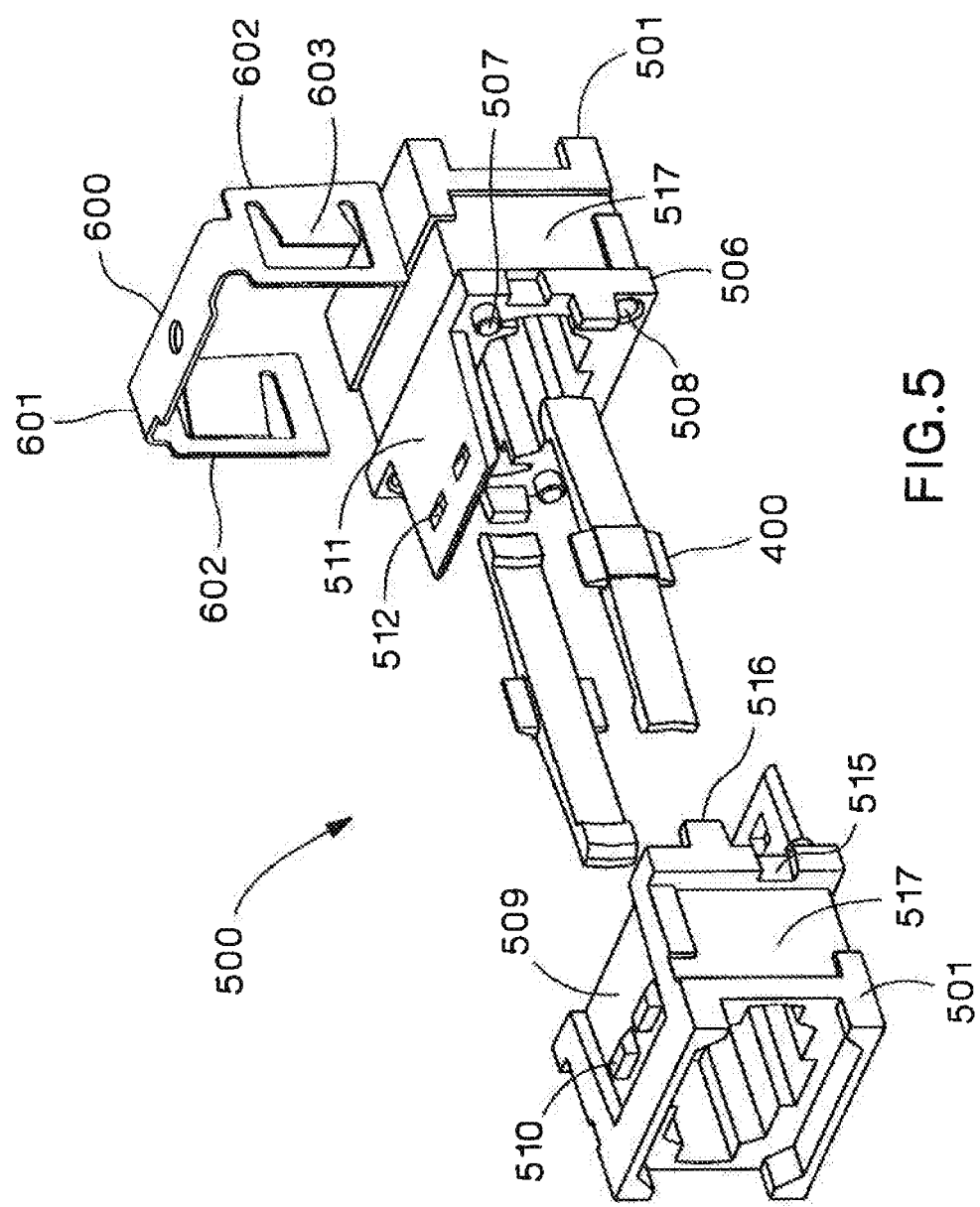
FIG. 5 is an exploded perspective view of a second embodiment of an MPO adapter with enhanced alignment.

FIG. 5 shows an alternative embodiment for an adapter 500. In the embodiment of FIG. 5, the housing halves 501 are identical in order to simplify manufacturing. Each housing half 501 has a receiving area 509, with one or more lever arm catches 510, a clip recess 517, a lever-arm 511 with one or more arm-slots 512, flanges 506 with assembly pins 507 located on diagonally opposite corners, assembly holes 508 also located on diagonally opposite corners, and flange tabs 516 and flange notches 515 incorporated into each of the flanges 506. The housing halves 501 are arranged such that the two housing halves 501 can be assembled by "flipping over" (rotating 180 degrees about a latitudinal axis) one of the housing halves 501 and snapping the two housing halves 501 together. The lever-arm 511 and arm-slots 512 of each housing half will engage the receiving area 509 and lever-arm catch 510 of the other housing half 501. The assembly pins 507 of each housing half 501 will engage the assembly holes 508 of the opposing housing half 501 and the flange tabs 516 of each housing half 501 will engage the flange notches 515 of the opposing housing half 501.

FIG. 5 also shows an MPO metal adapter clip 600 for fastening the adapter 500 to a panel or cassette. The clip 600 can be a tool-formed spring steel component. The clip 600 generally forms a "staple" shape in which the "staple" shape defines a base 601 and a pair of legs 602. Two panel retention latches 603 are formed on the legs of the clip for securing the adapter 500 to a panel or cassette. The retention latches 603 are arranged such that they deflect as the adapter 500 is passed through a panel opening and then spring back to lock the adapter 500 in place. The clip 600 can engage a clip recess 512 located on one or both of the housing halves 501 (FIGS. 2 and 3 show an embodiment where the clip 600 is secured to the male housing half 202 of the adapter 200).

Figure 6A:
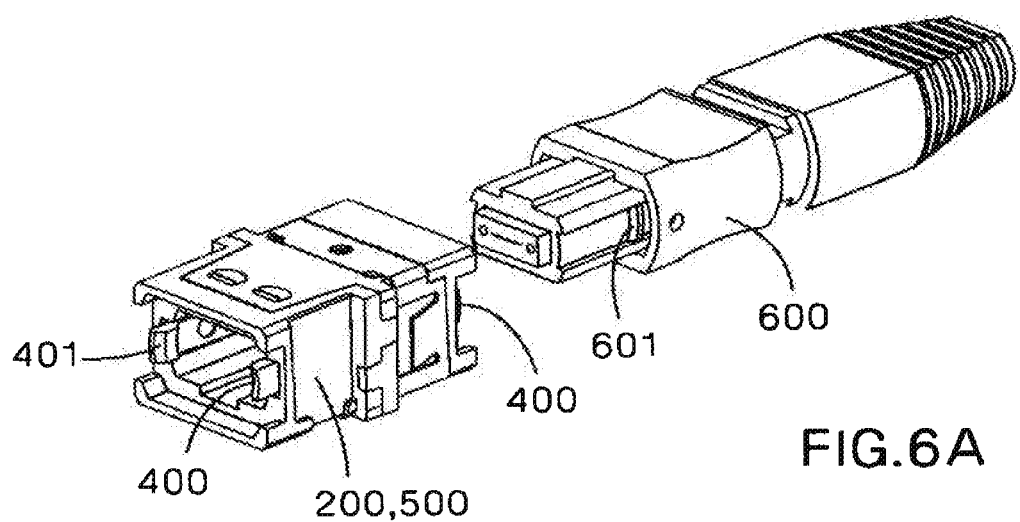
FIGS. 6A and 6B are perspective views showing an MPO connector being inserted into an MPO adapter with enhanced alignment.
Figure 6B:
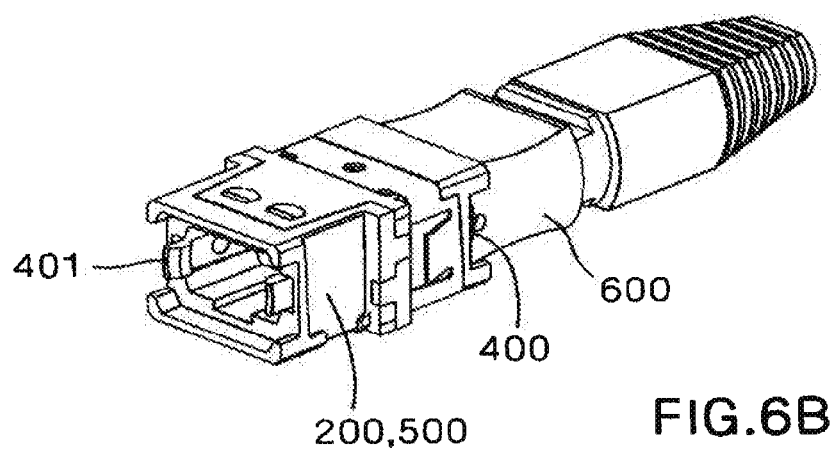

FIGS. 6A and 6B show a standard MPO connector 600 being inserted into an assembled adapter 200, 500. The engagement features 401 of opposing floating latches 400 engage the retention notches 601 of the connector in order to secure the connector in the adapter 200, 500. As previously mentioned, the floating latches 400 span the length of the adapter 200, 500 and the distance between retention notches 601 of opposing connectors 600 when the connectors are inserted into both sides of the adapter.

The walls of the adapter 200, 500 parallel to the longitudinal axis can be flat in order to allow the adapters to be stackable. The adapters 200, 500 can also be sized to retrofit existing panel and cassette installs that utilize SC style connectors or LC duplex connectors in order to provide an upgrade path to 40/100 gig fiber installations.

Unlike single-piece MPO adapter designs, the latch and housing materials of the present invention can be different so that the design can be optimized from a performance, cost, and process perspective with greater flexibility. For example, the housing can be made of metal for shielding or improved strength characteristics while the latches could be plastic for flexibility. The latches can be made from a high performance engineering resin while the housing could be made of a lower performance, low cost resin to control costs. The two-piece design also avoids mold processing issues associated with single piece design. In particular, latch performance and reliability may be affected because of knit lines, voids, short shots, molded-in residual stress, and voids resulting from material flow restrictions due to part geometry in the latch area. The undesirable part alterations can impact mechanical performance, such as shortening the latch geometry, in order to process the part. The two-piece design allows the latch to be molded separately which greatly improves processing and eliminates these issues.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. An adapter for connecting two opposing fiber optic connectors comprising:
   a housing, the housing containing a channel extending from a first face to a second face;
   latch pockets contained within opposite sides of the channel; and
   a pair of floating connector latches configured to be contained within the latch pockets, the pockets containing the floating connector latches with a clearance fit such that the floating connector latches can float within the latch pockets, the floating connector latches having engagement features on each end and configured to span a distance between corresponding retention notches on the opposing fiber optic connectors.

2. The adapter of claim 1 wherein the housing comprises two opposing housing halves.

3. The adapter of claim 2 wherein the two opposing housing halves comprise a male housing half and a female housing half.

4. The adapter of claim 3 wherein the housing halves further comprise polarity keyways.

5. The adapter of claim 4 wherein the mating features of the female housing half are configured with a rotational symmetry of 180 degrees about a longitudinal axis.

6. The adapter of claim 5 wherein the male housing half comprises a pair of lever-arms projecting from opposite edges of a mating face and the female housing half comprises receiving areas on opposite faces, the lever-arms configured to engage the receiving areas.

7. The adapter of claim 6 wherein the lever-arms engage the receiving areas via catch-slots on the lever arms engaging lever-arm catches in the receiving areas.

8. The adapter of claim 7 further comprising assembly pins and assembly holes.

9. The adapter of claim 8 wherein the assembly pins and assembly holes are located on flanges.

10. The adapter of claim 9 wherein the flanges further comprise flange tabs and flange slots.

11. The adapter of claim 2 wherein the adapter comprises two identical housing halves.

12. The adapter of claim 11 wherein the identical housing halves comprise a lever-arm extending from a first edge of a mating face and a receiving area on a face proximate to a second edge of the mating face, the first edge being opposite to the second edge and the lever-arm of a first identical housing half configured to engage a receiving area of a second identical housing half after the second housing half is rotated 180 degrees about a latitudinal axis relative to the first housing half.

13. The adapter of claim 12 further comprising assembly pins and assembly holes.

14. The adapter of claim 13 further comprising flanges with flange tabs and flange slots.

15. The adapter of claim 2 wherein at least one housing half contains a clip recess area configured to accept an adapter clip.

* * * * *